Figure 1:
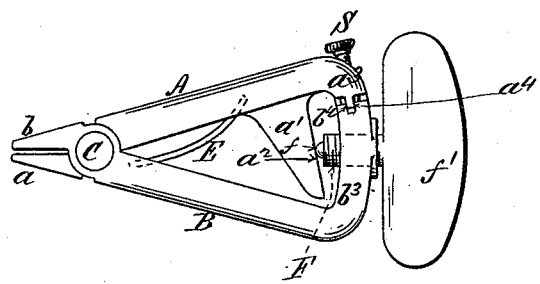

(No Model.)

A. A. LOW.
PLIERS.

No. 419,272. Patented Jan. 14, 1890.

Witnesses:
D. W. Gardner
G. T. Miatt

Inventor:
Abbot Augustus Low
By his Attorney
Geo. W. Miatt

UNITED STATES PATENT OFFICE.

ABBOT AUGUSTUS LOW, OF BROOKLYN, NEW YORK.

PLIERS.

SPECIFICATION forming part of Letters Patent No. 419,272, dated January 14, 1890.

Application filed April 5, 1889. Serial No. 306,090. (No model.)

*To all whom it may concern:*

Be it known that I, ABBOT AUGUSTUS LOW, a citizen of the United States, residing at the city of Brooklyn, in the county of Kings and State of New York, have invented certain new and useful Improvements in Pliers and Similar Implements, of which the following is a specification sufficient to enable others skilled in the art to which the invention appertains to make and use the same.

My improvements relate to pliers and to implements for grasping and rotating clock-spindles and similar articles requiring winding or tightening, and are designed to afford a simple, compact, and powerful device.

The invention is especially applicable to the form of implement shown and described in my application, Serial No. 301,397, filed February 27, 1889, in which the distinguishing feature consists in so arranging the parts of the device that the strain thereon in use tends constantly to tighten the gripping-jaws upon anything introduced between them, the device consisting, essentially, of two levers pivotally connected, the short arms of which are formed into gripping-jaws, while the long arms are formed, the one with an inclined plane extending diagonally across the longitudinal axis of the implement and the other lever with an actuating-screw the axis of which coincides with or is substantially parallel to the said longitudinal axis of the implement in such manner that the rotation of the screw tends constantly to close the gripping-jaws. Owing to the comparatively great degree of power that can be attained in practice by thus arranging the inclined plane and the actuating-screw to act in conjunction with each other in applying pressure, I find that the long arms of the levers are liable to become bent or distorted in use by reason of the unequal distribution of strain throughout the implement, and it is the main object of my present invention to obviate this difficulty and to render the device more accurate and uniform in construction and operation.

The invention consists in so constructing the ends of the long arms or levers that they interlock or lap one over the other concentrically with relation to the fulcrum of the implement, thereby relieving the lever upon which the incline plane is formed from excess of pressure in use and counteracting the natural tendency of these ends of the levers to spread apart under strain.

Another feature of my invention consists in the employment of a locking-screw which engages the actuating or power screw in such manner that the latter may be set or held in a prescribed position for the purpose of enabling it to be used either as a right-hand or as a left-hand turning implement, or to lock the jaws upon an object or set them to a particular use.

In the accompanying drawings I show my improvements applied in practical form to an implement of the class designated, although I do not wish to confine myself to the identical form of parts shown, since it is obvious that their construction may be modified without deviating materially from the essential features of my invention.

Figure 3:
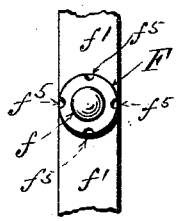
Figure 2:
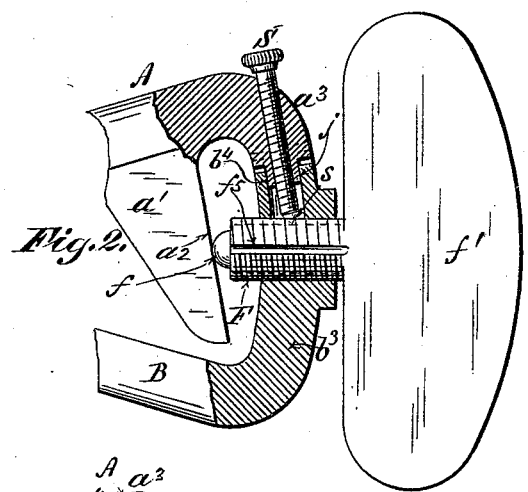
Figure 4:
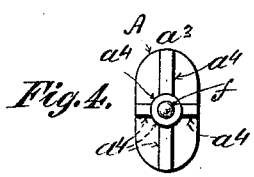

Figure 1 represents a side elevation of my improved form of implement of an ordinary size, the remaining figures being shown as enlarged for convenience of illustration. Fig. 2 is a view with the ends of the levers partially broken away and shown in central section. Fig. 3 is an elevation of the inner end of the actuating-screw; Fig. 4, a view of the inner side of the end of the upper lever, and Fig. 5 a view of the opposed face of the end of the lower lever and the actuating-screw beyond.

The levers A and B cross each other at the pivot or fulcrum C, so that the gripping-jaws $a$ and $b$ approach or recede from each other simultaneously with the drawing together or separation of the levers A and B.

It is of course obvious that my improvements in construction may be applied to any ordinary form of pliers, nippers, or clamping device having flat, round, or other special form of jaws, and I do not claim or limit myself to any special shape of the gripping-surfaces.

A spring E, bearing against the inner sides of both of the opposed levers, tends constantly to separate the levers A and B, and consequently to separate the gripping-jaws $a$ and $b$ in like proportion. The action of the spring E is limited and controlled by the bearing of the inner end $f$ of the actuating-screw F against the inclined surface $a^2$ of the diagonally-projecting spur or abutment $a'$, forming part of the lever A, from the inner side of which it projects diagonally across the longitudinal axis of the said actuating-screw F, as shown in the drawings. The forcible impingement of the end $f$ of the screw F against the bearing-surface $a^2$ of the abutment $a'$ causes the levers A and B and the jaws $a$ and $b$ to close more or less rapidly, according to the pitch or inclination given to the said inclined bearing-surface $a^2$. In like manner the power of the device may be increased or diminished by varying the angle of lateral projection of the inclined plane $a^2$ with relation to the path or longitudinal axis of the actuating-screw F. The cross-head $f'$ of the actuating-screw F is made sufficiently broad and large to afford a convenient hold for the fingers, and is designed to be used as the handle of the implement, the application of power to effect the rotation or tightening of the implement being effected through the screw itself, insuring a close fit of the jaws $a$ and $b$ and a tenacious hold upon the article to be operated upon.

Figure 5:
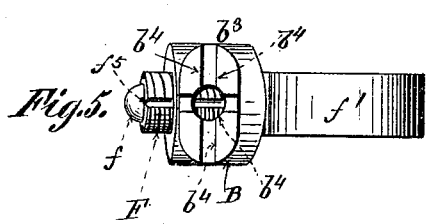

The outer ends of the levers A and B are formed with inwardly-projecting members $a^3$ and $b^3$, which approach each other and interlock in such manner as to permit of the necessary but limited degree of motion between the jaws. It is obvious that this interlocking or engagement of the opposed ends $a^3$ $b^3$ of the levers A B may be effected by various mechanical means other than the identical form of parts shown in the accompanying drawings, in which latter the lever A is formed with projecting shoulders $a^4$, which engage with corresponding shoulders $b^4$, formed upon the lever B. The surfaces constituting the joint $j$ between these shoulders are concentric with the fulcrum C, so as to insure contact of the shoulders under all circumstances of adjustment. The end $a^3$ of the lever A is also provided with a screw S, the inner end $s$ of which is adapted to engage suitable grooves or recesses $f^5$, formed on the periphery of the actuating-screw F, as illustrated in Figs. 2, 3, and 5 of the drawings. By this means the actuating-screw may be locked in a prescribed position, adapting the device to be used as a right and left hand turning or winding implement or to be "set" for any particular purpose or use, or to be locked upon an object.

The shoulders $a^4$ $b^4$ both take up and neutralize the longitudinal strain upon the levers, distributing it uniformly between them and rendering the device more perfect and durable in use. It will be noticed that the shoulders $a^4$ $b^4$ are formed to prevent both lateral and longitudinal deflection or displacement between the levers, and it is obviously immaterial what form is imparted to said interlocking shoulders, the essential feature of the invention in this respect consisting in coupling the ends of the levers together without interfering with their motion with relation to each other.

What I claim as my invention, and desire to secure by Letters Patent, is—

1. In an implement substantially such as described, the combination of the levers A and B and jaws $a$ $b$, the inclined plane $a^2$, the actuating-screw F, and the overlapping shoulders $a^4$ $b^4$, the whole arranged and operating substantially in the manner and for the purpose set forth.

2. In an implement substantially such as described, the combination of the levers A and B, and jaws $a$ $b$, the inclined plane $a^2$, the actuating-screw F, having the peripheral recesses $f^5$, and the screw S, for engaging therewith, the whole arranged and operating substantially in the manner and for the purpose set forth.

3. In an implement substantially such as described, the combination of the levers A B, jaws $a$ $b$, inclined plane $a^2$, actuating-screw F, having peripheral recesses $f^5$, locking-screw S, for engaging with said recesses $f^5$, and the overlapping shoulders $a^4$ $b^4$, the whole arranged and operating substantially in the manner and for the purpose set forth.

ABBOT AUGUSTUS LOW.

Witnesses:
D. W. GARDNER,
GEO. W. MIATT.